United States Patent

Reneau

Patent Number: 5,378,865
Date of Patent: Jan. 3, 1995

[54] MULTI-DIRECTIONAL SHOCK SENSOR

[75] Inventor: Daniel R. Reneau, Madison, Wis.

[73] Assignee: Hamlin, Inc., Lake Mills, Wis.

[21] Appl. No.: 124,267

[22] Filed: Sep. 20, 1993

[51] Int. Cl.$^6$ ............................................. H01H 35/14
[52] U.S. Cl. ..................... 200/61.45 R; 200/61.45 M; 200/61.48; 200/61.52; 335/205
[58] Field of Search .................. 200/61.45 R, 61.53, 200/61.45 M, 81.9 M, 82 E, 84 C; 335/205, 206, 207

[56] References Cited

U.S. PATENT DOCUMENTS

| | | | |
|---|---|---|---|
| 4,016,535 | 4/1977 | Dimlocker | 340/440 |
| 4,705,922 | 11/1987 | Seeger et al. | 200/61.45 M |
| 4,916,266 | 4/1990 | Tetrault | 200/61.45 R |
| 4,982,684 | 1/1991 | Rubey | 116/203 |
| 4,987,276 | 1/1991 | Bader et al. | 200/61.45 M |
| 5,149,926 | 9/1992 | Ono | 200/61.45 M |
| 5,153,394 | 10/1992 | Abendroth et al. | 300/61.52 |
| 5,165,717 | 11/1992 | Tanaka | 280/734 |
| 5,194,706 | 3/1993 | Reneau | 200/61.45 R |
| 5,212,357 | 5/1993 | Reneau | 200/61.45 M |

FOREIGN PATENT DOCUMENTS

2263580 7/1993 United Kingdom .

Primary Examiner—J. R. Scott
Attorney, Agent, or Firm—Lathrop & Clark

[57] ABSTRACT

A housing has a vertical subframe in which is mounted one or more reed switches. A magnet is mounted to a carriage which is mounted about the reed switch by a two-degree-of-freedom joint. The carriage forms a cup with a base aperture which surrounds the subframe. The aperture defines a semi-spherical surface which rides on a semi-spherical surface at the base of the subframe. A shell is fixed to the housing and the inside surface of the shell has a semi-spherical surface concentric with the semi-spherical surfaces defined by the annulus of the aperture and the semi-spherical base of the subframe. The carriage has semi-spherical surface portions which engage the shell interior and is thereby constrained to rotate about the point of concentricity common to the shell, the carriage, the annular aperture, and the semi-spherical base of the subframe. The carriage is biased to an upright position by springs which extend between the base of the housing and an upper lip of the carriage. When the shock sensor experiences an acceleration in any direction perpendicular to the axis defined by the central reed switch, the magnet acts as an acceleration sensing mass and reacts to the acceleration, causing tilting of the carriage which moves the magnet into a position that causes the reed switch to close.

29 Claims, 6 Drawing Sheets

MULTI-DIRECTIONAL SHOCK SENSOR

FIELD OF THE INVENTION

This invention relates to shock sensors in general and to shock sensors employing reed switches in particular.

Background of the Invention

Shock sensors employing reed switches are used in motor vehicles including cars and aircraft to detect vehicle collisions. When such a collision occurs, the shock sensor triggers an electronic circuit for the actuation of one or more safety devices. Devices which may be actuated include airbags, safety-belt tensionors, fuel system shut-off, and radio distress signals. Shock sensors typically employ a reed switch and an acceleration sensing magnet. In one type of shock sensor, an acceleration sensing magnet is constrained to move axially adjacent to or about a reed switch. The acceleration sensing magnet is typically biased by a spring in the unactuated position. Such shock sensors are useful for detecting accelerations along a single axis. In a typical application, multiple shock sensors will be used, each aligned with a direction along which crash forces are expected.

One known shock sensor for a seat-belt tightening apparatus achieves multi-axial actuation of a reed switch by a magnet which responds to an acceleration and employs an annular magnet arranged on the upper edge of a bearing cup. The bearing cup is arranged in a cylindrical cavity formed in a housing. The cylindrical cavity is co-axial with the longitudinal axis of a reed switch. The bearing cup tapers downward from a large diameter surrounded by the annular magnet to a bell-shaped, tapered end. The tapered end can be directly mounted on the wall of the cylindrical cavity, or be guided in its tumbler movement by a centralizing element.

Such known multi-directional shock sensor does not completely constrain the movement of the actuating magnet so as to prevent purely vertical or rotational movement. Nor do such previous multi-shock sensors provide damping mechanisms to prevent an oscillatory acceleration of low magnitude from actuating the device.

What is needed is a multi-directional shock sensor in which the motion of the sensing magnet is completely constrained and in which means are provided for damping out vibration-induced accelerations.

Summary of the Invention

The shock sensor of this invention has a carriage mounted by a two-degree-of-freedom joint to a housing and damped and restored to a vertical orientation by springs or the like which extend between the carriage and the housing. A subframe extends vertically upwardly from the housing and mounts one or more reed switches. The reed switch is mounted vertically on the subframe and defines a vertical axis. The carriage is axially mounted about the reed switch by a ball-and-socket-type joint forerod between the cup-like base of the carriage and a semi-spherical surface positioned about the base of the subframe where the subframe joins the housing. The base of the carriage cup has an aperture which surrounds the subframe. An annular ring defines an aperture in the base of the carriage which has a semi-spherical surface which rides on the semi-spherical base of the subframe. Thus, the carriage is free to tilt in any direction about the axis defined by the reed switch.

A shell is fixed to the housing which has an inside concave semi-spherical surface concentric with the semi-spherical surface defined by the annulus of the aperture and the semi-spherical base of the subframe. The carriage has convex semi-spherical surface portions which engage the inside semi-spherical surface of the shell. Thus, the carriage is constrained to rotate about the point of concentricity common to the shell semi-spherical surfaces, the carriage semi-spherical surfaces, the annular aperture semi-spherical surface, and the a semi-spherical base of the subframe, which are all concentric.

The carriage is biased to an upright position by four spaced springs which are positioned between the base of the housing and an upper spring-retaining lip of the carriage. The carriage has a frustoconical magnet with an interior aperture which surrounds the subframe and the central reed switch.

When the shock sensor experiences an acceleration in any direction perpendicular to the axis defined by the central reed switch, the magnet acts as an acceleration sensing mass and reacts to the acceleration, causing tilting of the carriage about a point of concentricity which moves the magnet into a position adjacent to the reed switch which causes the reed contacts to close. To prevent rotation of the carriage around the axis an anti-rotation device such as a fiat spring which has low resistance to flexure in two planes but high resistance to extension connects the carriage to the housing in such a way that rotation of the carriage requires extension of the spring.

It is an object of the present invention to provide a shock sensor with multiple axis sensitivity.

It is also an object of the present invention to provide a shock sensor with controlled damping of the movements of the shock sensing mass.

It is yet another objective of the present invention to provide a shock sensor wherein the biasing springs may be individually adjusted.

It is a still further object of the present invention to provide a multi-axis shock sensor wherein the sensing mass is at all times constrained to axially tilting away from the reed switch.

Further objects, features and advantages of the invention will be apparent from the following detailed description when taken in conjunction with the accompanying drawings.

DESCRIPTION OF THE PREFERRED EMBODIMENT

Figure 3:
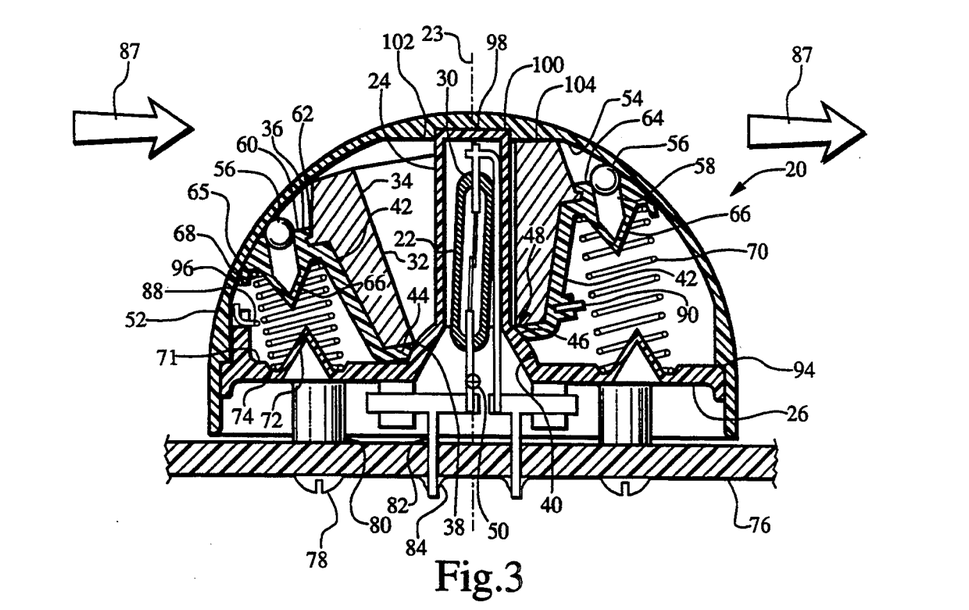
FIG. 3 is a cross-sectional view of the shock sensor of FIG. 1 undergoing acceleration.

Referring more particularly to FIGS. 1-11 wherein like numbers refer to similar parts, a shock sensor 20 is shown in FIGS. 1, 2, 3 and 4. The shock sensor 21) has a reed switch 22 which is vertically mounted in a subframe 24 on a housing 26. The reed switch 22 is conventional, having two reeds 28 sealed in a glass capsule 30. The reeds 28 react to the presence of a magnetic field by contacting each other, as shown in FIG. 3, so closing a circuit.

Figure 1:
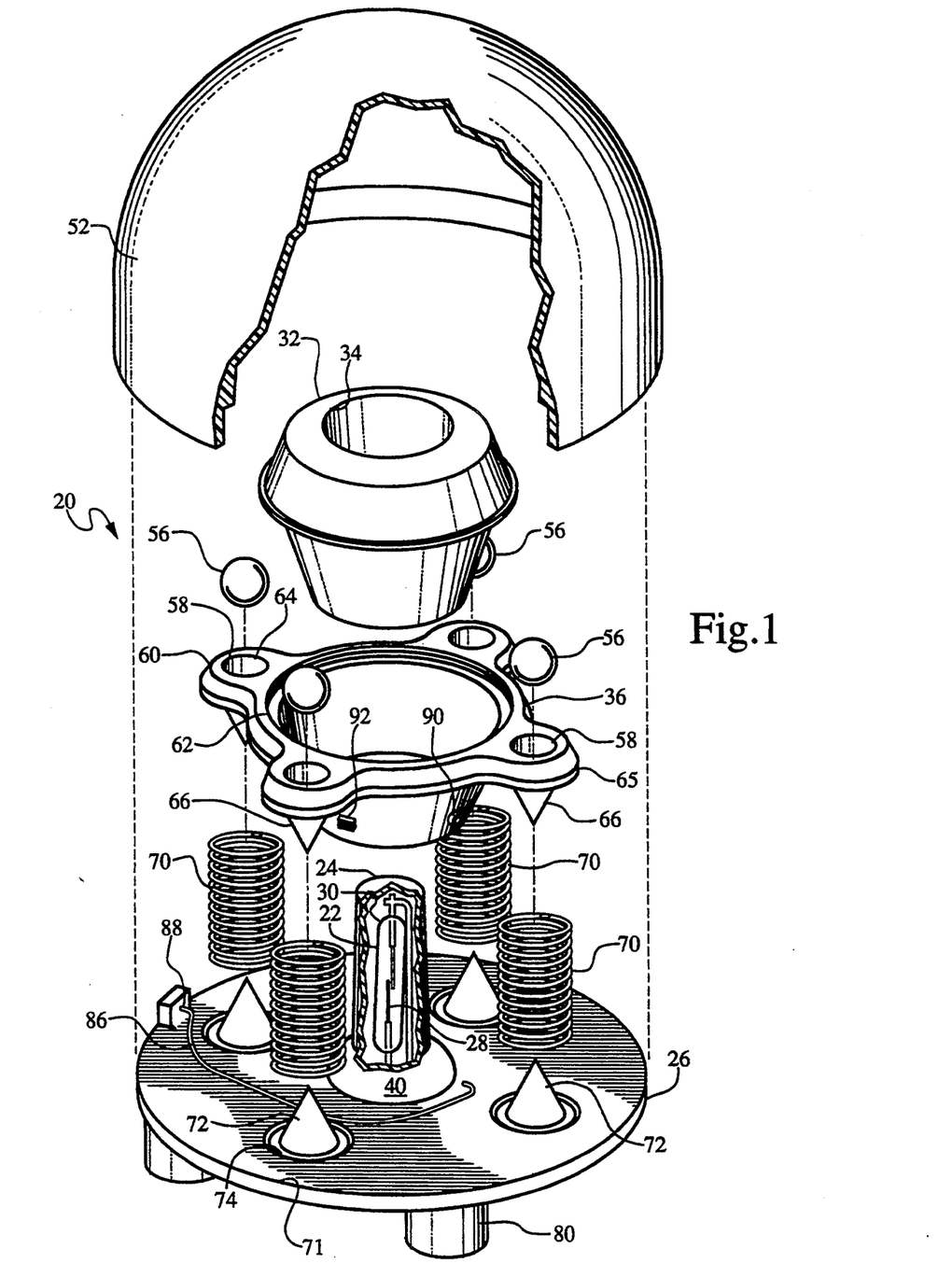
FIG. 1 is an exploded isometric view, partly cut away, of the shock sensor of this invention.
Figure 2:
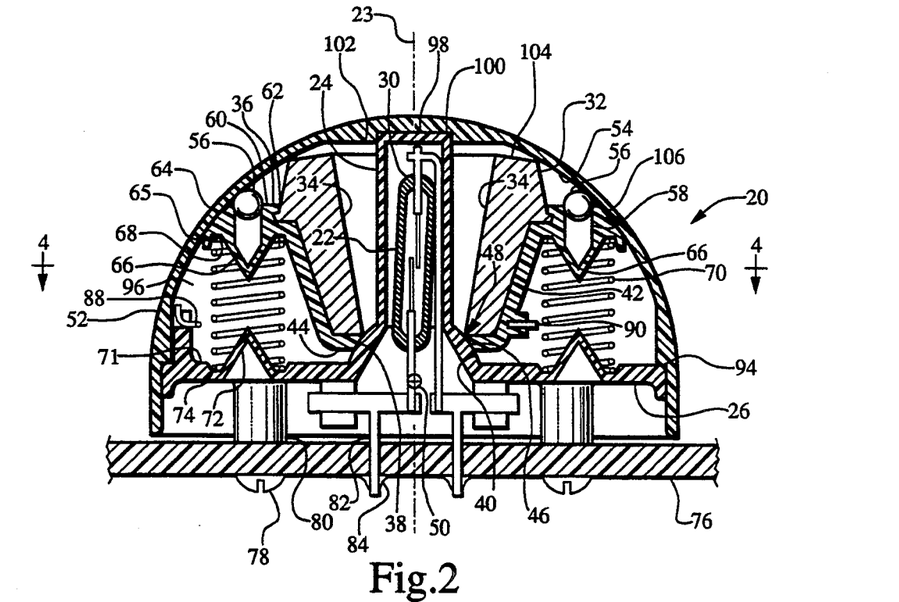
FIG. 2 is a cross-sectional view of the shock sensor of FIG. 1 not undergoing any acceleration.

The multi-directional shock sensor 20 has an actuating magnet 32 with a frustoconical interior aperture 34 which surrounds and is spaced about the subframe 24. The exterior of the magnet is generally frustoconical and tapers downwardly. The magnet 32 is connected to a carriage 36, for example, by a snap-fit engagement with the carriage. The magnet 32 actuates the reed switch 22 when it is tilted toward the reed switch 22. The carriage 36 is mounted to the housing 26 by a two-degree-of-freedom joint 38. The joint 38 in the embodiment of FIG. 1 is of the ball and socket type and is formed in part by a semi-spherical convex protrusion 40 at the base of the subframe 24.

The carriage 36 has downwardly extending frustoconical portions which define a hollow cup 42 within which is mounted the magnet 32. The cup has a base 44 with a central aperture 46 defined by a surrounding annulus 48. The annulus 48 defines a narrow semi-spherical concave surface which rides on the semi-spherical protrusion 40, thus forming the joint 38. The annulus 48 of the carriage cup base riding on the semi-spherical base 41) of the subframe 24 allows the cartage 36 to tilt relative to the subframe 24 and the reed switch 22 mounted therein. The carriage 36 is able to tilt in all directions about the point of concentricity 50.

A shell 52 is mounted to the housing 26 and encloses the carriage 36. The shell 52 has an inside concave semi-spherical surface 54 which is concentric with the semi-spherical subframe base 40 and the annulus 48 in the base 44 of the carriage cup 42. The carriage 36 is captured between the housing and the shell such that the carriage base annulus 48 is constrained to ride on the semi-spherical base protrusion 40 of the subframe 24. The carriage includes four ball beatings 56 which ride on the inside surface 54 of the shell 52. The ball bearings are engaged against and bear on ball bearing cups 58 which are formed into a peripheral lip 60 which extends outwardly from the upper edge 62 of the carriage cup 42. The ball bearings 56 are spaced at 90° intervals within the ball bearing cups 58 in the upper edge 64 of the lip 60 of the carriage 36.

Downwardly protruding cones 66 extend from the carriage lip 60 beneath the ball bearing cups 58 on the bottom 65 of the lip 60. The cones 66 are surrounded by depressions 68 which serve to retain coil springs 70. The springs 70 are retained on the base 71 of the housing 26 by cones 72 which extend upwardly from the housing. The housing cones 72 are surrounded by depressions 74. The four equally spaced springs 70, best shown in FIG. 1, are held between the carriage cones 66 and the housing cones 72. The springs 70 bias the carriage 36 to an upright position centered about the subframe 24.

The multi-directional shock sensor 20 may be conveniently mounted to a circuit board 76 by screws 78 in screw mounts 80. The shock sensor 20 in a preferred embodiment is approximately one inch to three-quarters of an inch across. The shock sensor 20 has leads 82 which protrude to the circuit board 76 where they are soldered by solder joints 84 to circuit traces (not shown) in a conventional manner such as by wave soldering. Thus, the multi-directional shock sensor 20 is a microelectronic device which can be integrated onto a circuit board which contains other electronic components which detect the closing of the reed switch and amplify, condition, and sustain the signal produced by the reed switch to actuate a safety device such as an airbag by initiating a gas generator cartridge that fills the airbag, or by turning on a transmitter to broadcast a distress signal such as used by downed airplanes.

The shock sensor 20 functions as shown in HG. 3 by responding to an acceleration in a given direction indicated by arrows 87. The magnet 32 functions as an acceleration-sensing mass which is fixed to the carriage and hence constrained by the annulus 48 riding on the semi-spherical protrusion 40 of the subframe 24 and the ball beatings 56 tiding on the inside surface 54 of the shell. The magnet 32 responds to forces produced by an acceleration by tilting within the housing 26. This tilting brings the magnet 32 adjacent to the subframe 24 which actuates the reed switch 22 contained therein.

Figure 4:
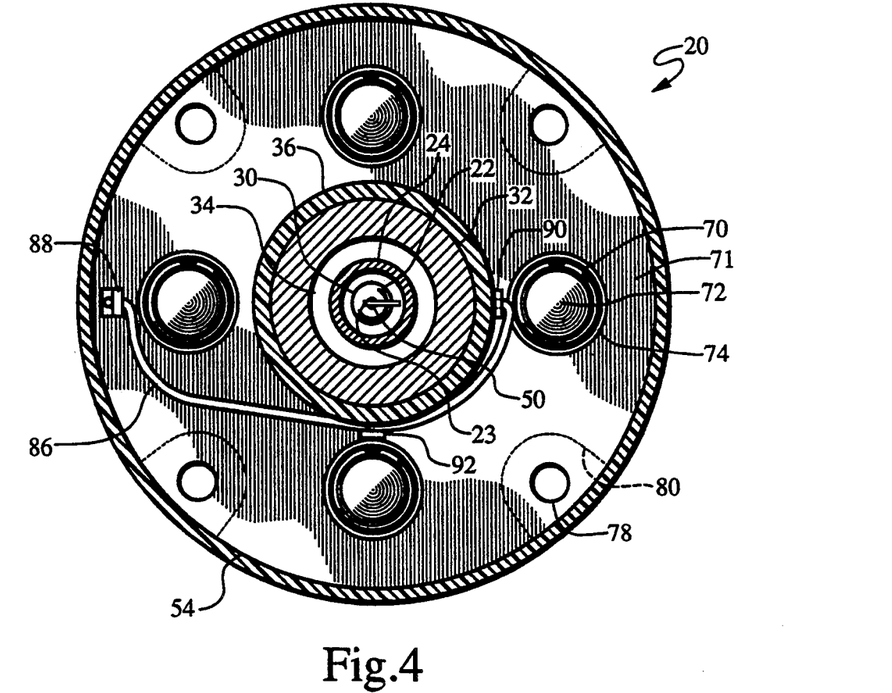
FIG. 4 is a cross-sectional view of the shock sensor of FIG. 2 taken along section line 4—4.

A tether 86, best shown in FIG. 4, joins the carriage 36 to the housing 26. The tether 86 is a metallic spring element which is very flexible in two planes but resists extension. The attachment point 88 to the housing 26 is spaced 180° from the attachment point 90 on the carriage 36 and passes through a retention loop 92 which extends from the carriage at 90° from the housing attachment point 88. Thus the tether 86 may readily twist or bend depending on the orientation of the acceleration which the sensor 20 is exposed to. The design of the tether 86 is such that little resistance to bending or torsion is provided by the tether 86. However, for the carriage 36 to rotate with respect to the housing 26 would require the tether to extend or be compressed, to which the tether is resistant, thus preventing undesirable rotation about the axis 23 defined by the reed switch 22.

The shell 52 may have a hermetic seal 94 where it is joined to the base 71 of the housing 26. The hermetic seal 94 seals the moving components of the shock sensor 20 from environmental contamination which might affect its reliability or functionality. The hermetic seal also allows the filling of the interior void 96 with a fluid such as an inert gas or oil. Filling the interior void 96 with oil could be used to increase the damping characteristics of the shock sensor 20. In addition, the use of a dense fluid to fill the interior void 96 of the shock sensor 20 would allow the use of floats positioned beneath the bottom 65 of the lip 60 to provide the vertical restoring force on the carriage 36.

An automobile when driving at a constant speed over a roadway with regular cracks can be forced into a front-to-rear oscillation of sustained duration. Sufficient damping should be present in the multi-directional shock sensor 20 to prevent the oscillation in the car from inducing an oscillation of the carriage which increases with each excitation, thus activating the reed switch. However, it is important that frictional forces in the shock sensor 20 be low relative to the restoring forces of the opposed springs 70 so that the carriage 36 returns to its vertical position centered about the subframe 24 after the removal of acceleration forces.

The shell 52 has a centrally located depression 98 which receives the top 100 of the subframe 24 which thus reinforces and rigidities both the shell 52 and the subframe 24. As shown in FIG. 3, a flat ring surface 102 spaced around the depression 98 functions as a stop for the carriage 36 where the top 104 of the magnet 32 abuts the ring surface 102, thus preventing the magnet 32 and the attached carriage 36 from impacting the subframe 24.

An alternative multi-directional shock sensor 20 may be constructed to operate without ball beatings 56 where the sliding surfaces on the upper edge of the lip 64 are brought into contact with the inside surface 54 of the shell 52. Where sliding contacts are used, such as between surface 106 and the shell inner surface 54 or the contact between the annulus 48 and the semi-spherical base 40 of the subframe 24, materials with selected coefficients of friction will be chosen to produce the appropriate amount of damping.

Figure 11:
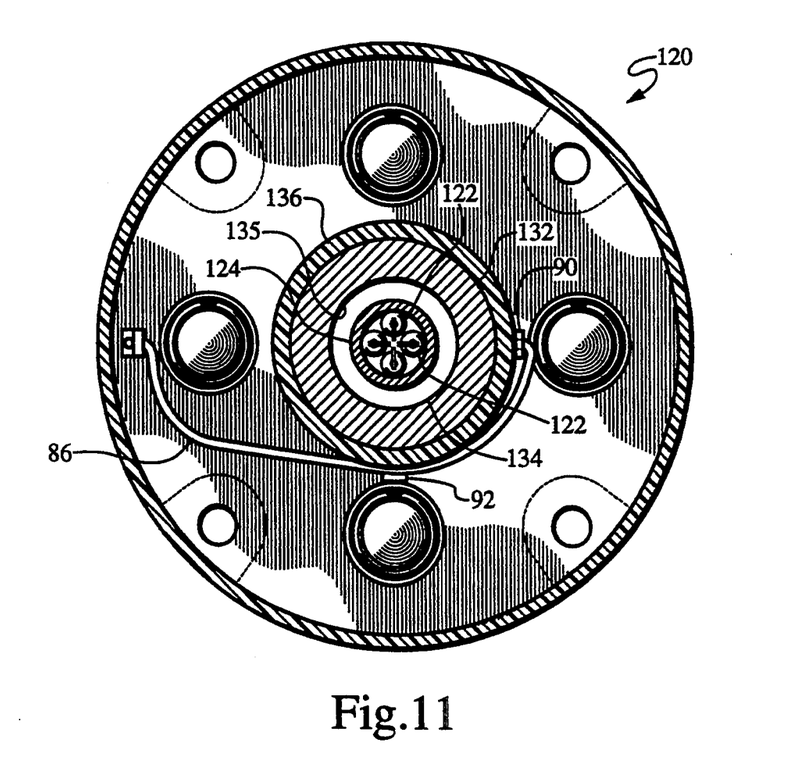
FIG. 11 is a horizontal cross-sectional view showing an alternative embodiment of FIG. 1 wherein multiple reed switches are employed for redundancy and directionality.

The shock sensor 20 may be modified to form the alternative embodiment shock sensor 120 shown in FIG. 11 in which the central reed switch 22 is replaced by multiple reed switches 122. The use of multiple reed switches 122 in the shock sensor 120 enables a determination of the directionality of the shock by analyzing which reed switches are actuated in what order. Thus, as the reed switch 120 is actuated, the interior surface 135 of the aperture 134 of the magnet 132, which is mounted on the carriage 136, will approach the subframe 124 and will cause the reed switch 122 closest to the magnet 134 to close first, thus indicating at least the quadrant in which the source of acceleration or crash originates.

The reed switches 122 and the shock sensor 120 will preferably be oriented such that one reed switch corresponds to the front quadrant of the car, one reed switch to the rear, one to the left, and one to the right side. Thus safety equipment, such as a deployable airbag, might in some circumstances not be activated in response to a rear crash, but would be activated in a head-on collision.

As another example, where the sensor is used on-board an aircraft or helicopter, where crashes normally take place in the direction of motion of the vehicle, the shock sensor 120 may be able to differentiate between a crash where fuel valves should be shut off and a mid-air collision, where shut-down of the engines may be undesirable.

Figure 5:
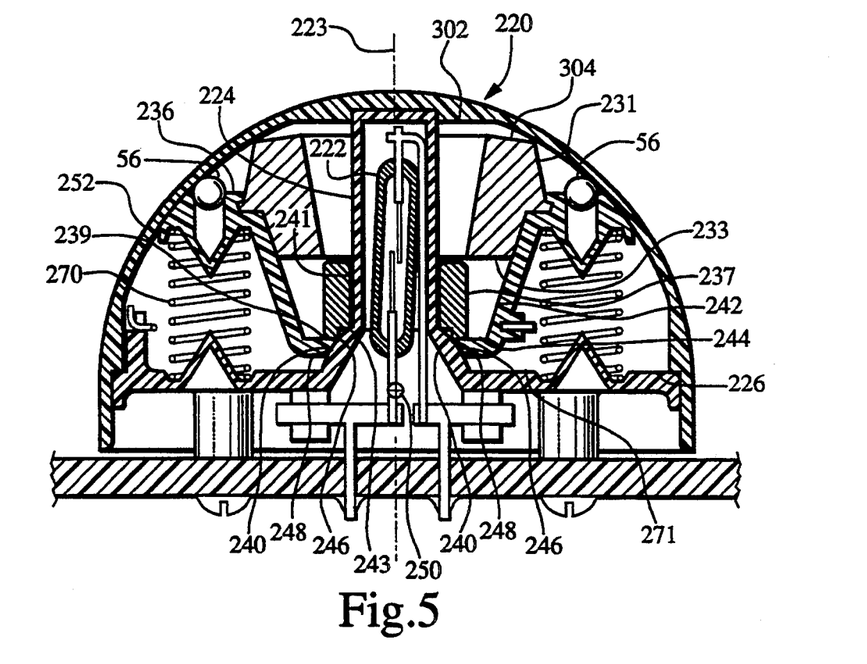
FIG. 5 is a cross-sectional view of an alternative embodiment shock sensor of this invention not undergoing acceleration.

Another alternative embodiment shock sensor 220 is shown in FIG. 5. The shock sensor 220 has an acceleration-sensing mass which is distinct from the actuation magnet. The shock sensor 220 has a reed switch 222, defining an axis 223, which is mounted on a subframe 224 which in turn extends upwardly from a housing 226. A carriage 236 is mounted to the housing 226 and has an aperture 246 defined by an annulus 248 which bears on the semi-spherical protrusion 240 of the subframe 224. The carriage 236 is captured by a shell 252 similar to the shell 52.

The reed switch 222 has a frustoconical acceleration sensing mass 231 which is concentrically attached to an upwardly opening cup 242 formed by the carriage but extends only about halfway down into the cup. The acceleration sensing mass 231 has a top 304 which abuts a flat surface 302 at the top of the shell 252 in the carriage fully tilted position. Beneath the top 304 of the conical mass 231 is a bottom surface 233. The bottom surface 233 is spaced from the base 244 of the carriage 236 cup 242.

A cylindrical magnet 237 is supported on the base 244 of the cup 242 adjacent to the annulus 248 defined by aperture 246 in the base 244 which surrounds the subframe 224. The cylindrical magnet 237 has a height nearly equal to the distance between the base 244 of the cup 242 and the bottom surface 233 of the conical mass 231. The cylindrical magnet 237 surrounds the subframe 224 and is slidable vertically thereon. The lower surface 239 of the cylindrical magnet 237 which rests on the base 244 has a small annular notch 243 which extends upwardly from the lower surface 239 to the inside cylindrical surface 241. The notch 243 provides clearance for the semi-spherical protruding base 240 of the subframe 224. The magnet 237 has a height such that the upper surface 245 of the magnet just slightly underlies the bottom surface 233 of the acceleration sensing mass 231. Thus, the magnet 237 is captured between the base 244 and the bottom surface 233 of the acceleration sensing mass 231. A small gap is left between the upper surface 245 of the cylindrical magnet 237 and the bottom surface 233 of the sensing mass 231 to allow for the downward slope of the surface 233 when it overlies the magnet 237 as the carriage 236 is tilted in response to an acceleration indicated by arrow 287 in FIG. 6.

Figure 6:
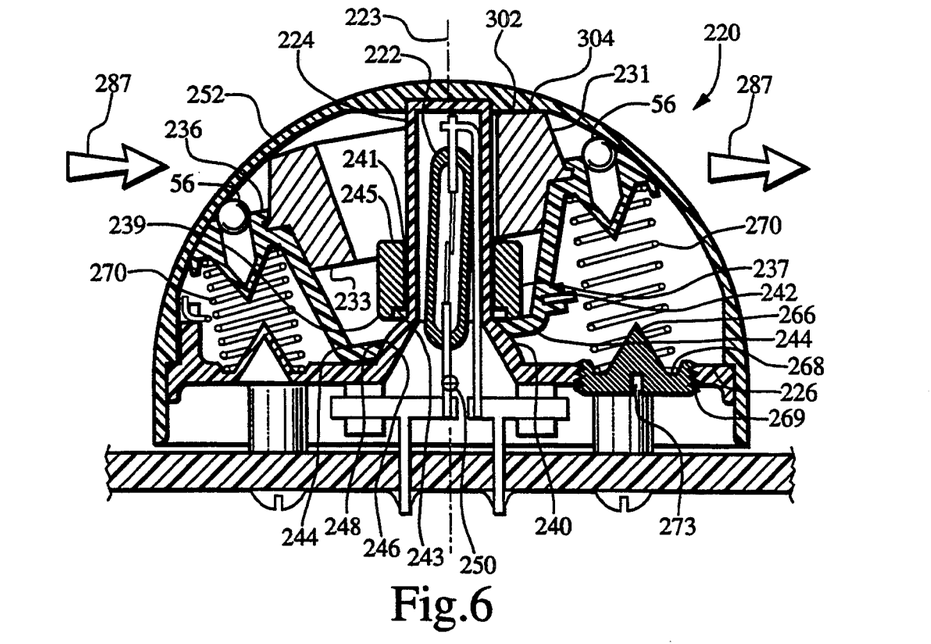
FIG. 6 is a cross-sectional view of the shock sensor of FIG. 5 undergoing acceleration showing an alternative, adjustable, spring mount.

The shock sensor 220 is shown in FIG. 6 in the actuated position with the carriage 236 tilted about the point of concentricity 250. The tilting of the cup 242, which is in engagement with the lower surface 239 of the cylindrical magnet, causes it to move upward along the subframe 224. This upward displacement of the cylindrical magnet causes the reed switch 222 to activate. The cylindrical magnet 237 has an outside diameter sized to assure that it is at all times captive between the bottom surface 233 of the conical mass and the base 244 of the cup 242.

Referring to FIG. 6 for illustrative purposes, a cone 266 and its surrounding depression 268 for retaining a spring 270 is shown threadedly engaged with the base 271 of the housing. The cone 266 has a screw socket 273 for an allen wrench such that the cone 266 and its surrounding depression 268 may be elevated or retracted to adjust the tension on the spring 270. Springs can be difficult to manufacture to tight tolerances and when they are used in opposed pairs, it can sometimes be desirable to match them or to provide a mechanism for adjusting the relative tension on each spring. Such a mechanism is provided by the threaded attachment of the spring mount 269.

Figure 7:
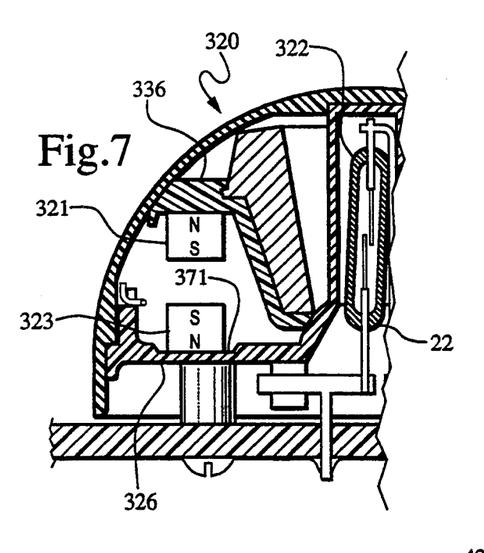
FIG. 7 is a fragmentary cross-sectional view of yet another embodiment of the shock sensor of this invention where opposed magnets are used instead of springs.

Another alternative embodiment of shock sensor 20 of this invention is shown in FIG. 7. The shock sensor 320 has opposed upper magnets 321 and lower magnets 323. The upper magnets 321 are rigidly mounted to a carriage 336 and the lower magnets 323 are rigidly mounted to the base 371 of the housing 326. The like poles of the upper magnets 321 and the lower magnets 323 are opposed, thus causing the upper magnets 321 to repel the lower magnets 323 and provide the restorative force to keep the carriage 336 centered about the reed switch 322.

Figure 8:
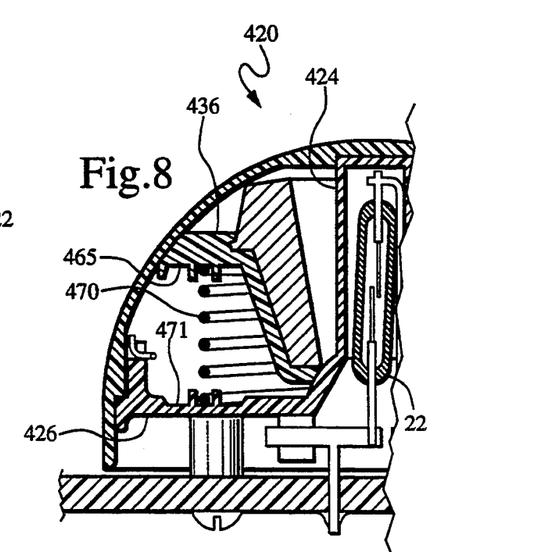
FIG. 8 is a fragmentary cross-sectional view of still another embodiment of the shock sensor of this invention where a single large spring is used between the carriage and the housing.

Yet another alternative embodiment shock sensor 420 is shown in FIG. 8. The shock sensor has a single coil spring 470 which is fixed between the bottom lip 465 of the carriage 436 and the base 471 of the housing 426. The spring 470 provides a somewhat more uniform force for restoring and biasing the carriage 436 into an upright position about the subframe 424.

Figure 9:
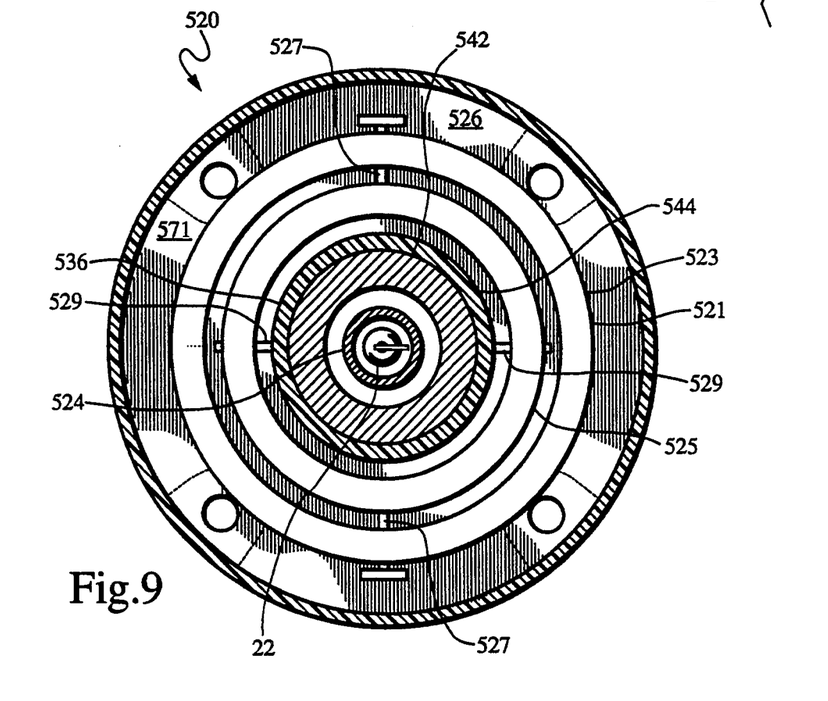
FIG. 9 is a horizontal cross-sectional view of yet another embodiment of the shock sensor of this invention wherein the carriage is joined to the housing by nested gimbals.

A horizontal cross-section of an alternative shock sensor 520 employing a gimbal mount 521 is shown in FIG. 9. The shock sensor 520 employs a two-degree-of-freedom universal joint formed by the gimbal 521 which is inherently resistant to rotation and so does not require a tether. The gimbal ring has an outer gimbal ring 523 and an inner gimbal ring 525. The outer gimbal ring 523 is rigidly mounted to the base 571 of the housing 526. The outer gimbal 523 is joined to the inner gimbal ring 525 by opposed outer hinges 527. The inner gimbal ring in turn has inner opposed hinges 529 which are joined to the base 544 of the cup 542 of the carriage 536. A spring (not shown for clarity) may be mounted between the outer gimbal ring 523 and the upper lip (not shown) of the carriage 536.

The gimbal mechanism 521 is similar to those typically used in the aircraft industry for supporting rate gyros. It may be readily formed by electro-discharge machining or photo-etching from a sheet of spring steel. Thus, the outer gimbal ring 521, the outer hinges 527, the inner gimbal ring 528, and the inner hinges 529 may be integrally formed. The two sets of hinges 527, 529, because they are located in planes spaced 90° apart, allow the carriage 536 to be tilted in any direction about the subframe 524.

Figure 10:
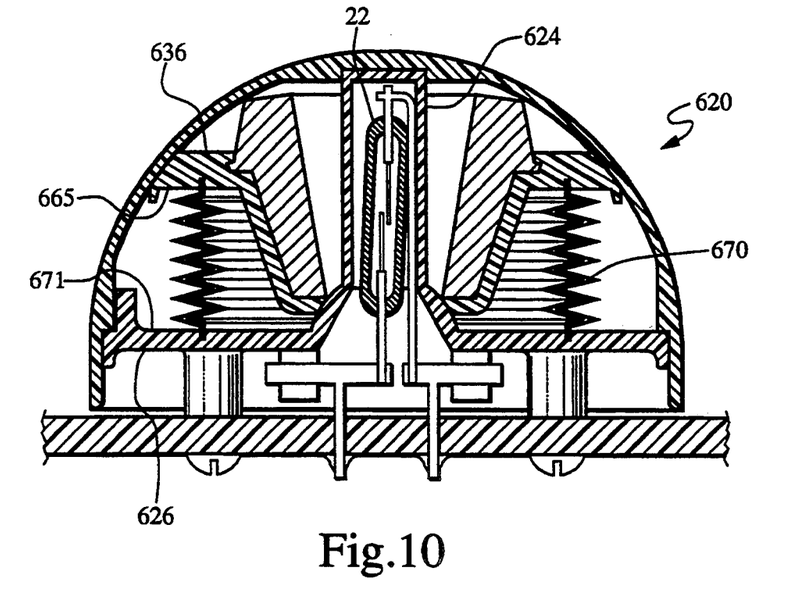
FIG. 10 is a cross-sectional view of yet another embodiment of this invention wherein a compressed bellows is used to bias and prevent rotation between the housing and the carriage.

Another alternative embodiment shock sensor 620, shown in FIG. 10, eliminates the requirement for the tether 86 shown in FIGS. 1, 4, and 11 by utilizing a spring bellows 670. The biasing springs 70 of FIG. 1 are replaced by a spring bellows 670 which is fixed between the bottom lip 665 of the carriage 636 and the base 671 of the housing 626. The spring bellows 670 provides a somewhat more uniform force for restoring and biasing the carriage 636 into an upright position about the subframe 624 and resists rotation of the carriage 636.

The carriage and shell of any of the embodiments of the shock sensor of this invention may further be configured to be non-symmetrical about the reed switch axis. For example, if it is desired to prohibit activation of the reed switch by accelerations in a certain direction, the shell may have protrusions formed therein which interfere with the tilting of the carriage in that direction.

It should be understood that where non-adjustable spring mounts are shown in FIGS. 1, 2, 3 and 5, adjustable spring mounts 269 such as shown in FIG. 6 could be used.

It should also be understood that where ball beatings between the carriage and the shell are shown in FIGS. 1-6, sliding surfaces between the shell and the housing as shown in FIGS. 7, 8 and 10 could be used.

It should also be understood that where a magnet 32 is shown which also functions as an acceleration sensing mass, the function could be broken up into two pans which would include a magnet mounted to the carriage 36 and a separate mass mounted to the carriage 36.

It should also be understood that where the magnet is shown as a solid unit, it could be composed of discrete magnets mounted on the carriage 36 and spaced about the central subframe 24.

It should yet further be understood that where the shock sensors 20, 220, 320, 420, 620 are shown mounted to a circuit board, they could be mounted directly to the structure of a vehicle with leads running to detecting circuitry at some distance from the shock sensor.

It should also be understood that additional reed switches could be mounted about the perimeter of the carriage so as to be actuated when the carriage tilts in a particular direction.

It should yet further be understood that although four springs 70 are shown, three springs or more could be employed.

It should also be understood that where the shock sensor 120 is shown to have four central reed switches, two or more switches could be employed.

It should further be understood that the travel range in any direction of the shock sensors 20, 120, 220, 320, 420, 520, 620 can be adjusted to remove sensitivity to impact or oscillation along a particular axis.

It is understood that the invention is not confined to the particular construction and arrangement of parts herein illustrated and described, but embraces such modified forms thereof as come within the scope of the following claims.

I claim:

1. A multi-directional shock sensor comprising:
    a) a housing;
    b) at least one reed switch mounted to the housing;
    c) a carriage pivotably mounted by to the housing by a joint having two degrees of freedom;
    d) a mass affixed to the carriage for causing pivoting of the carriage about the joint in response to an acceleration;
    e) a shell fixed to the housing which engages the carriage, the shell constraining the carriage throughout the carriage's motion;
    f) a magnet engaged with the carriage, wherein pivoting of the carriage brings the magnet into proximity to the reed switch to cause a change in state of the reed switch in response to an acceleration applied to the sensor; and
    e) a means for biasing the carriage in a vertical direction, the means for biasing being disposed below the carriage and extending between the carriage and the housing.

2. The shock sensor of claim 1 wherein the mass also comprises the magnet.

3. The shock sensor of claim 1 wherein the means for biasing is at least one spring.

4. The shock sensor of claim 3 further comprising at least one adjustable mount connected to the housing, wherein at least one spring is connected to a mount to permit adjustable application of a preload to the spring.

5. The shock sensor of claim 1 wherein the means for biasing comprises opposed magnetic pairs.

6. The shock sensor of claim 1 wherein the means for biasing is a single coil spring disposed axially around the vertical reed switch and between the housing and the carriage.

7. The shock sensor of claim 1 wherein the engagement between the shell and the carriage is formed by ball bearings.

8. A multi-directional shock sensor comprising:
a) a housing;
b) at least one reed switch vertically mounted to the housing and defining a vertical axis;
c) a carriage co-axially mounted about the reed switch, the carriage being tiltable in more than one direction with respect to the vertical axis;
d) a mass affixed to the carriage which causes tilting of the carriage in response to an acceleration;
e) a shell connected to the housing which engages the carriage, the shell constraining the carriage throughout the carriage's motion;
f) a magnet engaged with the carriage and movable in response to the tilting of the carriage for changing the state of the reed switch in response to motion of the carriage and;
g) at least one spring which extends between the carriage and the housing such that the carriage is biased in an untilted condition.

9. The shock sensor of claim 8 wherein the mass also comprises the magnet.

10. The shock sensor of claim 8 further comprising a means for resisting rotation of the carriage about the vertical axis defined by the reed switch.

11. The shock sensor of claim 8 further comprising at least one adjustable mount connected to the housing, wherein at least one spring is connected to a mount to permit adjustable application of a preload to the spring.

12. The shock sensor of claim 8 wherein the carriage has a plurality of ball bearings which engage with the shell.

13. A multi-directional shock sensor comprising:
a) a housing;
b) a reed switch vertically mounted to the housing and defining a vertical axis;
c) portions of the housing which define a semi-spherical surface which encircles the reed switch;
d) a carriage having a base, wherein portions of the base define an aperture through which the reed switch extends, and wherein portions of the carriage base define a semi-spherical surface which overlies and engages with the housing semi-spherical surface, the carriage being thus mounted for tillable motion with respect to the reed switch, such that an accelerative three applied to the shock sensor in a direction other than vertical causes the tilting of the carriage;
e) a shell fixed to the housing and engaged with the carriage, the shell constraining the vertical and horizontal translation of the carriage;
f) a magnet mounted to the carriage such that tilting of the carriage in response to an acceleration causes the magnet to move with respect to the reed switch thereby causing the reed switch to change its state; and
g) means for biasing the carriage in a vertical direction, the means for biasing being disposed below the carriage and extending between the carriage and the housing.

14. The shock sensor of claim 13 further comprising a resilient member which extends between the housing and the carriage, the resilient member permitting the tilting of the carriage, but resisting rotation of the carriage about the reed switch axis.

15. The shock sensor of claim 13 wherein the means for biasing comprises at least one spring.

16. The shock sensor of claim 13 wherein the means for biasing comprises:
a) at least two first magnets mounted to the carriage; and
b) a second magnet corresponding to each first magnet mounted to the housing beneath a first magnet, wherein like poles of said corresponding first and second magnets face one another.

17. The shock sensor of claim 13 wherein the carriage has a plurality of ball bearings supported thereon and the ball bearings engage with the shell.

18. The shock sensor of claim 13 wherein the means for biasing comprises a single coil spring disposed axially around the vertical reed switch and between the housing and the carriage.

19. A multi-directional shock sensor comprising:
a) a housing;
b) a subframe joined to the housing and extending upwardly therefrom;
c) a reed switch vertically mounted to the housing on the subframe and defining a axis;
d) a carriage axially mounted about the reed switch to permit inclination of the carriage with respect to housing in more than one direction with respect to the axis, wherein the carriage has a hollow cup with a base and portions of the base define an aperture, the aperture surrounding the sub frame and the reed switch;
e) a mass affixed to the carriage for causing motion of the carriage in response to an acceleration;
f) a shell fixed to the housing and engaged with the carriage, wherein the shell constrains the carriage to remain in engagement with the housing while the carriage is inclined from the vertical;
g) an annular activation magnet which surrounds the subframe and which is supported on the carriage cup base such that when the carriage is inclined in response to an acceleration, the inclined base forces the annular magnet to rise along the subframe to thus activate the reed switch; and
h) a means for biasing the carriage in a vertical direction, the means for biasing being disposed below the carriage and extending between the carriage and the housing.

20. The apparatus of claim 19 wherein the mass has a bottom surface which is above the magnet, and wherein the magnet is constrained against vertical motion by the mass bottom surface which prevents vertical motion of the magnet independent of tilting of the carriage.

21. The apparatus of claim 19 further comprising a means for resisting rotation of the carriage about the axis defined by the reed switch.

22. The apparatus of claim 19 wherein the means for biasing comprises a plurality of springs which extend between the housing and the carriage.

23. The apparatus of claim 22 further comprising at least one adjustable mount connected to the housing, wherein at least one spring is connected to a mount to permit adjustable application of a preload to the spring.

24. The apparatus of claim 19 wherein the means for biasing comprises a plurality of pairs of magnets, one of each pair connected to the carriage, and the other of said pair connected to the housing.

25. The shock sensor of claim 19 wherein the means for biasing comprises a single coil spring disposed axially around the vertical reed switch and between the housing and the carriage.

26. The shock sensor of claim 19 wherein the engagement between the shell and the carriage is formed by ball bearings.

27. A multi-directional shock sensor comprising:
a) a housing;
b) at least one reed switch mounted to the housing, the reed switch defining an axis;
c) a carriage mounted about the axis defined by the reed switch, wherein the carriage is tiltable with respect to the axis and is held in engagement with the housing throughout the range of carriage motion;
d) a mass affixed to the carriage for causing tilting of the carriage in response to an acceleration;
e) a magnet in engagement with the carriage and movable in response to the tilting of the carriage for changing the state of the reed switch in response to an acceleration; and
f) a means for biasing the carriage in a vertical direction, the means for biasing being disposed below the carriage and extending between the carriage and the housing.

28. The shock sensor of claim 27 wherein the mass also comprises the magnet.

29. The shock sensor of claim 27 further comprising: a shell surrounding the carriage and sealed to the housing so forming a sealed void, the sealed void being filled with a fluid, the fluid providing a damping effect on the motion of the carriage.

* * * * *